United States Patent [19]

Hanke

[11] 4,017,496
[45] Apr. 12, 1977

[54] PROCESS FOR PREPARING PIGMENTARY QUINACRIDONE IN PREDETERMINED CRYSTAL FORM

[75] Inventor: Albert Robert Hanke, Scotch Plains, N.J.

[73] Assignee: E. I. Du Pont de Nemours and Company, Wilmington, Del.

[22] Filed: Nov. 21, 1975

[21] Appl. No.: 634,170

[52] U.S. Cl. .................... 260/279 QA; 106/288 Q
[51] Int. Cl.² ........................................ C09B 48/00
[58] Field of Search .......... 260/279 QA; 106/288 Q

[56] References Cited

UNITED STATES PATENTS

| 2,844,581 | 7/1958 | Manger et al. | 260/279 QA |
| 3,020,279 | 2/1962 | Woodlock et al. | 260/279 QA |
| 3,272,821 | 9/1966 | Schweizer | 260/279 QA |

OTHER PUBLICATIONS

Chung et al., Chemical Abstracts, vol. 76 18970v, (1972).

Primary Examiner—Donald G. Daus
Assistant Examiner—Diana G. Rivers

[57] ABSTRACT

Process for preparing pigmentary quinacridone in the α-, β-, and γ-form by vacuum evaporating crude quinacridone at an elevated temperature from 400° C. to 550° C. at from $10^{-3}$ mmHg to $10^{-5}$ mmHg, rapidly condensing the evaporated crude quinacridone to form an amorphous condensate and contacting the amorphous condensate with o-dichlorobenzene or dimethylformamide to form pigmentary quinacridone. This process eliminates the need for acid pasting, salt milling, and solvent milling conventionally used to produce pigmentary quinacridone.

3 Claims, No Drawings

PROCESS FOR PREPARING PIGMENTARY QUINACRIDONE IN PREDETERMINED CRYSTAL FORM

BACKGROUND OF THE INVENTION

This invention is directed to the preparation of pigmentary quinacridone in the α-, β-, γ-form.

Quinacridone is a well-known compound and is commonly prepared by three typical methods, i.e., (1) cyclization of 2,5-diarylamino-terephthalic acids, (2) oxidation of dihydroquinacridone, and (3) reduction of quinacridonequinones, described in Chem. Rev., Vol. 67, No. 1, Labana et al., *Quinacridones*, pages 3–5. The quinacridone which results from these processes, referred to as crude quinacridone, is generally unsuitable for direct use as a pigment and must be subjected to further processing to reduce the particle size and produce a definite crystal form of quinacridone.

The α-, β-, and γ-forms of pigmentary quinacridone are well-known and widely used commercially. The α-form is prepared by precipitation of solution of crude quinacridone in sulfuric acid, known as acid pasting, or upon its being heated with aqueous potassium hydroxide, as described, for example, in Japanese Patent 20,073, Chem. Abstr., 62, 10437 (1965). Crude quinacridone or other forms of quinacridone is converted to the α-form by dry ball-milling with sodium chloride, e.g., Reidinger et al. U.S. Pat. No. 2,844,484. The β-form is prepared by ball-milling crude quinacridone or other forms of quinacridone with sodium chloride in the presence of an aromatic hydrocarbon, e.g., Struve U.S. Pat. No. 2,844,485. The γ-form is prepared by ball-milling crude quinacridone or other forms of quinacridone with sodium chloride in the presence of dimethylformamide, e.g., Manger et al. U.S. Pat. No. 2,844,581.

All of the commonly used methods for converting crude quinacridone to a pigmentary and definite crystal form, described above, employ large quantities of strong acid or inorganic salt and milling which necessitates further processing steps to separate the pigment from the acid, salt and mill.

This invention provides for a process for preparing pigmentary quinacridone in the α-, β-, or γ-form which eliminates the need for acid pasting or milling.

SUMMARY OF THE INVENTION

According to this invention there is provided a process for preparing pigmentary quinacridone in a predetermined crystal form selected from the group consisting of α-, β-, and γ-form by the steps of
i. vacuum evaporating crude quinacridone at an elevated temperature from 400° C. to 550° C., and preferably from 450° C. to 500° C., in a high vacuum of from $10^{-3}$ mmHg to $10^{-5}$ mmHg,
ii. rapidly condensing the evaporated crude quinacridone on a substrate at a temperature of less than 40° C. to form an amorphous condensate, and
iii. contacting the condensate with an organic liquid selected from the group consisting of o-dichlorobenzene and dimethylformamide to form pigmentary quinacridone. To prepare pigmentary quinacridone in the α-form the condensate is contacted with o-dichlorobenzene at a temperature from 20° C. to 50° C., and preferably at room temperature, for at least 24 hours. The β-form is prepared by contacting the condensate with boiling o-dichlorobenzene for five minutes to 30 minutes, and preferably for at least 15 minutes. The γ-form is prepared by contacting the condensate with dimethylformamide at a temperature from 20° C. to 50° C., and preferably at room temperature, for five minutes to 30 minutes, and preferably for at least 15 minutes.

DETAILED DESCRIPTION OF THE INVENTION

Vacuum evaporation of crude quinacridone in accordance with this invention is distinguished from conventional sublimation of crude quinacridone, as described for example in Schweizer U.S. Pat. No. 3,272,821, in that under the elevated temperatures and high vacuum specified above the crude quinacridone is vaporized rapidly, i.e., within minutes, condensed to a substantially amorphous condensate. The term "amorphous" means that the condensate is so poorly crystalline that it is difficult to characterize as to crystal phase. X-ray diffraction and spectrophotometry suggest that the amorphous condensate may be a mixture of α- and β-phases. Tinctorially the amorphous condensate is very dull. In contrast, conventional sublimation, employing slow condensation, forms large single crystals of quinacridone which are visable to the unaided eye.

Although this invention is not bound by any particular theory or explanation, it is believed that the vacuum evaporation followed by rapid condensation produces a molecularly disordered material in a state of extreme aggregation which causes the broadening of light absorption bands resulting in a dull tint. The disordered aggregated condition is eliminated by contact with o-dichlorobenzene or dimethylformamide. The organic liquids facilitate molecular ordering to a specific crystal form and break down the aggregation.

The crude quinacridone used in this invention can be obtained by any of the well-known synthetic methods or purchased commercially. The source of crude quinacridone is not critical.

Any apparatus capable of withstanding the elevated temperature and high vacuum utilized in this invention can be used to practice this invention. A bell jar vacuum evaporator is especially preferred since the evaporated crude quinacridone can rapidly condense on the inner surface of the bell jar immediately after evaporation. Heat is preferably supplied to the crude quinacridone by means of a hot wire, such as a platinum wire carrying electric current, placed in the vicinity of or in contact with the crude quinacridone under vacuum. In practice the crude quinacridone is heated under vacuum until evaporation is complete and the vacuum is maintained, without additional heating, until the apparatus cools. The condensate is then recovered from the cooled surface on which it has condensed, e.g., the inner surface of a bell jar.

The recovered condensate is preferably contacted with organic liquid by stirring the condensate in an excess of the organic liquid. The α-form is produced by stirring the condensate in o-dichlorobenzene preferably at room temperature and the β-form is produced in the same liquid at the boiling point or reflux. The γ-form is produced by stirring the condensate in dimethylformamide preferably at room temperature. There is no need to solvent or salt mill the condensate with the organic liquid. The resulting quinacridone can be recovered from the organic liquid by conventional filtration, washing, and drying. The quinacridone so produced exhibits excellent tinctorial properties and may be used directly in a variety of pigmentary systems, e.g., automotive finishes, house paints, plastics, etc., without the need for further processing.

The following examples illustrate the invention.

EXAMPLE 1

To effect evaporation and subsequent condensation of crude quinacridone, a conventional bell jar type vacuum evaporator is used. A platinum wire which is connected to a source of electric current is formed into a spiral coil and placed in a porcelain crucible. One gram of crude quinacridone is placed in the crucible and the crucible is placed in the bell jar. A vacuum is drawn to about $10^{-4}$ mmHg. While maintaining the vacuum, current is passed through the platinum wire to heat the crude quincaridone to a temperature of about 500° C. for about five minutes to completely evaporate the crude quinacridone and form a condensate on the inside of the bell jar. The current is turned off and the vacuum is maintained until the apparatus is cooled to about room temperature. The vacuum is broken and one gram of crude quinacridone is placed in the crucible and the evaporation procedure is repeated. This procedure is repeated nine times.

The condensate is recovered from the inside of the bell jar by scraping it off. The condensate is amorphous, i.e., very poorly crystalline, and is tinctorially very dull.

EXAMPLE 2

One gram of the condensate prepared in Example 1 is stirred in 100 ml. of 0-dichlorobenzene for 250 hours at room temperature. The resulting product is filtered, acetone washed and dried to give a bright red pigment. X-ray diffracton of this pigment shows it to be substantially completely in the α-form of quinacridone.

Since the color properties of the α-form of quinacridone and the γ-form of quinacridone are very similar and no commercial α-form of quinacridone is available as a standard, tinctorial comparison of this pigment is made versus a commercially available γ-form quinacridone pigment. When tested by rubout on a Hoover muller in lithographic varnish (a well-known and conventional test for the tinctorial properties of colored pigments), this pigment is stronger, slightly bluer and much darker in masstone than the commercially available γ-form.

EXAMPLE 3

Two grams of the condensate prepared in Example 1 are added to 200 ml. of o-dichlorobenzene preheated to 180° C., the reflux temperature. Heating is continued to boiling and held at the boiling point for 15 minutes. The resulting product is isolated as in Example 2.

The product is analyzed by X-ray diffraction and found to be substantially completely in the β-form of quinacridone. When tested as described in Example 2, this pigment is bluer, or equal strength, and lighter in masstone than an identically tested commercially available quinacridone pigment of the β-form.

EXAMPLE 4

One-half gram of the condensate prepared in Example 1 is stirred in 100 ml. of dimethylformamide at room temperature for 15 minutes. The resulting product is then isolated as in Example 2.

The product is analyzed by X-ray diffraction and found to be substantially completely in the γ-form of quinacridone. When tested as described in Example 2, this pigment is stronger, more yellow, more intense, and lighter in masstone than an identically tested commercially available quinacridone pigment of the γ-form.

What is claimed is:
1. Process for preparing pigmentary quinacridone in the α-form by the steps of
    i. vacuum evaporating crude quinacridone at an elevated temperature from 400° C. to 500° C. in a high vacuum of from $10^{-3}$ mmHg to $10^{-5}$ mmHg,
    ii. rapidly condensing the evaporated crude quinacridone on a substrate at a temperature of less than 40° C. to form an amorphous condensate, and
    iii. contacting the condensate with o-dichlorobenzene at room temperature to form pigmentary quinacridone in the α-form.
2. Process for preparing pigmentary quinacridone in the β-form by the steps of
    i. vacuum evaporating crude quinacridone at an elevated temperature from 400° C. to 500° C. in a high vacuum of from $10^{-3}$ mmHg to $10^{-5}$ mmHg,
    ii. rapidly condensing the evaporated crude quinacridone on a substrate at a temperature of less than 40° C. to form an amorphous condensate, and
    iii. contacting the condensate with boiling o-dichlorobenzene to form pigmentary quinacridone in the β-form.
3. Process for preparing pigmentary quinacridone in the γ-form by the steps of
    i. vacuum evaporating crude quinacridone at an elevated temperature from 400° C. to 500° C. in a high vacuum of from $10^{-3}$ mmHg to $10^{-5}$ mmHg,
    ii. rapidly condensing the evaporated crude quinacridone on a substrate at a temperature of less than 40° C. to form an amorphous condensate, and
    iii. contacting the condensate with dimethylformamide at room temperature to form pigmentary quinacridone in the γ-form.

* * * * *